Patented Aug. 9, 1927.

1,638,272

UNITED STATES PATENT OFFICE.

CLARENCE H. OHLWILER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

COMPOSITION FOR CLEANING GLASS WHICH WILL PREVENT MISTING AND THE COLLECTION OF GLOBULES OF MOISTURE THEREON.

No Drawing. Application filed February 14, 1924. Serial No. 692,895.

This invention relates to liquid cleaners and polishers for glass and has for its leading object the provision of a solution which will serve to add to and increase the cleanliness and polish of glass and like substances.

Further objects of the invention are to provide a solution of this character which will prevent misting on the glass; which will prevent smearing while the glass is being cleaned and polished; which will provide a solution that will quickly dry, which will be antiseptic, and will have a pleasing odor and color.

Another object of the invention is to provide a solution of this character which will form a surface film on the glass which will break up the globular formation of rain drops, spray, water, and mist on the surface of the glass, causing the same to dispose itself evenly and smoothly over the glass so that clear vision may be had therethrough.

It will be understood that many variations may be made in the ingredients and proportions of the solution to obtain these objects, depending upon which one of the objects is desired to be accentuated and which ones to be considered of lesser importance.

I have found the following formula will produce a solution giving very satisfactory results in all of these respects.

Formula for one liter or one thousand cubic centimeters: Cocoanut oil potash soap, 5.5 grams; Turkey red oil (either not neutralized or neutralized with potassium hydroxide 2.5 grams; alcohol (No. 1 denatured), 20 cubic centimeters; glycerine, 2 grams. Perfumes (synfleur): Aromol 1 (antiseptic), 0.4 cubic centimeters; Rosol, 0.1 cubic centimeters; Orientol, 0.1 cubic centimeters; Jasminol, 0.1 cubic centimeters. Dye: wool violet 4 BN (national), 40 cubic centimeters of a 0.1% solution.

This solution is prepared as follows: Dissolve the soap and neutralized Turkey red oil in luke-warm distilled water at about one hundred degrees Fahrenheit, diluting to about 940 cubic centimeters. Add the dye solution. Then add the alcoholic solution of perfumes while stirring the colored soap solution. Adjust the volume with distilled water and mix thoroughly. Allow to settle over night, and then siphon off the clear solution for use. The Turkey red oil is neutralized by thoroughly mixing with a strong solution of caustic potash, using about fifty per cent potassium hydroxide and adding sufficient to give alkaline reaction; stir vigorously and apply heat.

The perfumes referred to are commercial perfumes, designated as Aromol, Rosol, Orientol and Jasminol.

A stock solution of the perfumes in the alcohol-glycerine mixture is made, and then I slowly add the exact volume of this stock solution to the colored soap solution while stirring the soap solution rapidly.

I make up a 0.1 per cent stock solution of the dye by dissolving 1.0 grams in water and diluting to 1000 cubic centimeters.

The completed solution should be allowed to settle in a cool place over night, and the clear solution should then be siphoned off without disturbing any sediment on the bottom.

As stated above, this solution is one of the preferred forms and is found to give very satisfactory results. Alteration may be made in the proportions and in the ingredients as desired, keeping in mind the results required. Also the order of mixing may be varied if found desirable, although the procedure given will obtain the results required.

As far as the dye and perfumes are concerned, it will be readily understood that several different kinds of dyes and perfumes may be used to suit any individual tastes, and their introduction into the solution does not have any effect upon their cleansing or anti-misting properties.

The antiseptic properties of the solution are obtained through the glycerine and the aromol and alcohol in the solution.

It has been found from use that this solution will give good results in cleaning lenses for eyeglasses and spectacles and optical instruments, wind-shields of automobiles, art glasses, and all things of a similar nature.

The cleansing properties of this solution are obtained through the cocoanut oil potash soap, Turkey red oil, and alcohol.

The anti-misting, or anti-dimming properties are obtained through the cocoanut oil potash soap, Turkey red oil, and the glycerine, separately or in combination.

The anti-dimming properties are obtained from the surface film which is deposited on the glass through the application of this solution. This anti-dimming effect is produced by the action of the film on the globules of moisture, by breaking them up and causing them to flow over the surface of the glass evenly and smoothly instead of being deposited thereon in the form of separated and distanct globules through which vision is practically impossible.

It has been found from experience that the glass treated with this solution will not steam, mist or sweat under sudden temperature changes, being of decided advantage for windshields and eyeglasses, etc., or other glasses exposed to fogging conditions.

I claim:

1. A detergent and anti-dimming composition consisting of water, cocoanut oil, potash soap, Turkey red oil, alcohol and glycerine.

2. A detergent and anti-dimming composition consisting of water, cocoanut oil potash soap 5.5 grams, Turkey red oil 2.5 grams, alcohol 20 cubic centimeters, glycerine 2 grams, per one liter.

CLARENCE H. OHLWILER.